(12) United States Patent
Srinivasan

(10) Patent No.: US 8,161,260 B2
(45) Date of Patent: Apr. 17, 2012

(54) OPTIMAL MEMORY ALLOCATION FOR GUESTED VIRTUAL MACHINE(S)

(75) Inventor: Kattiganehalli Y. Srinivasan, Princeton Junction, NJ (US)

(73) Assignee: Oracle International Corporation, Redwood City, CA (US)

( * ) Notice: Subject to any disclaimer, the term of this patent is extended or adjusted under 35 U.S.C. 154(b) by 355 days.

(21) Appl. No.: 12/322,901

(22) Filed: Feb. 9, 2009

(65) Prior Publication Data
US 2010/0205395 A1 Aug. 12, 2010

(51) Int. Cl.
G06F 13/00 (2006.01)
(52) U.S. Cl. ......................................... 711/170; 711/154
(58) Field of Classification Search .................. 711/154, 711/170
See application file for complete search history.

(56) References Cited

U.S. PATENT DOCUMENTS

| | | | |
|---|---|---|---|
| 7,418,584 B1 * | 8/2008 | Klaiber et al. | 712/229 |
| 2005/0198464 A1 | 9/2005 | Sokolov | |
| 2005/0246505 A1 | 11/2005 | McKenney et al. | |
| 2008/0091891 A1 | 4/2008 | Shiota et al. | |
| 2008/0177974 A1 | 7/2008 | Chiang et al. | |
| 2008/0307180 A1 | 12/2008 | Hattori et al. | |
| 2009/0187697 A1 * | 7/2009 | Serebrin | 711/6 |
| 2010/0138829 A1 * | 6/2010 | Hanquez et al. | 718/1 |
| 2010/0241785 A1 * | 9/2010 | Chen et al. | 711/6 |

FOREIGN PATENT DOCUMENTS
WO WO 2005/116828 12/2005

OTHER PUBLICATIONS

"Virtual machine memory access tracing with hypervisor cache" http://portal.acm.org/citation.cfm?id=1364388 Year of Publication: 2007 4 Pages.

* cited by examiner

Primary Examiner — Reba I Elmore
(74) Attorney, Agent, or Firm — Osha • Liang LLP

(57) ABSTRACT

Methods and apparatus allocate and adjust memory of a hardware platform hosting a plurality of guest virtual machines. One of the virtual machines is configured as a management domain that determines whether other virtual machines comply with a performance computing policy. If not, an initial amount of memory for the other virtual machines is adjusted higher or lower. In this manner, the guest machines are each outfitted with sufficient memory to accomplish their respective workloads, and such is adjusted over time as workloads vary per machine. This distributes throughput concerns throughout an entire platform to sufficiently guarantee a quality of service for each machine of the platform, regardless of its individual tasks. Other features contemplate specific computing policies regarding page fault rates and computer program products for assisting in the foregoing, to name a few.

20 Claims, 6 Drawing Sheets

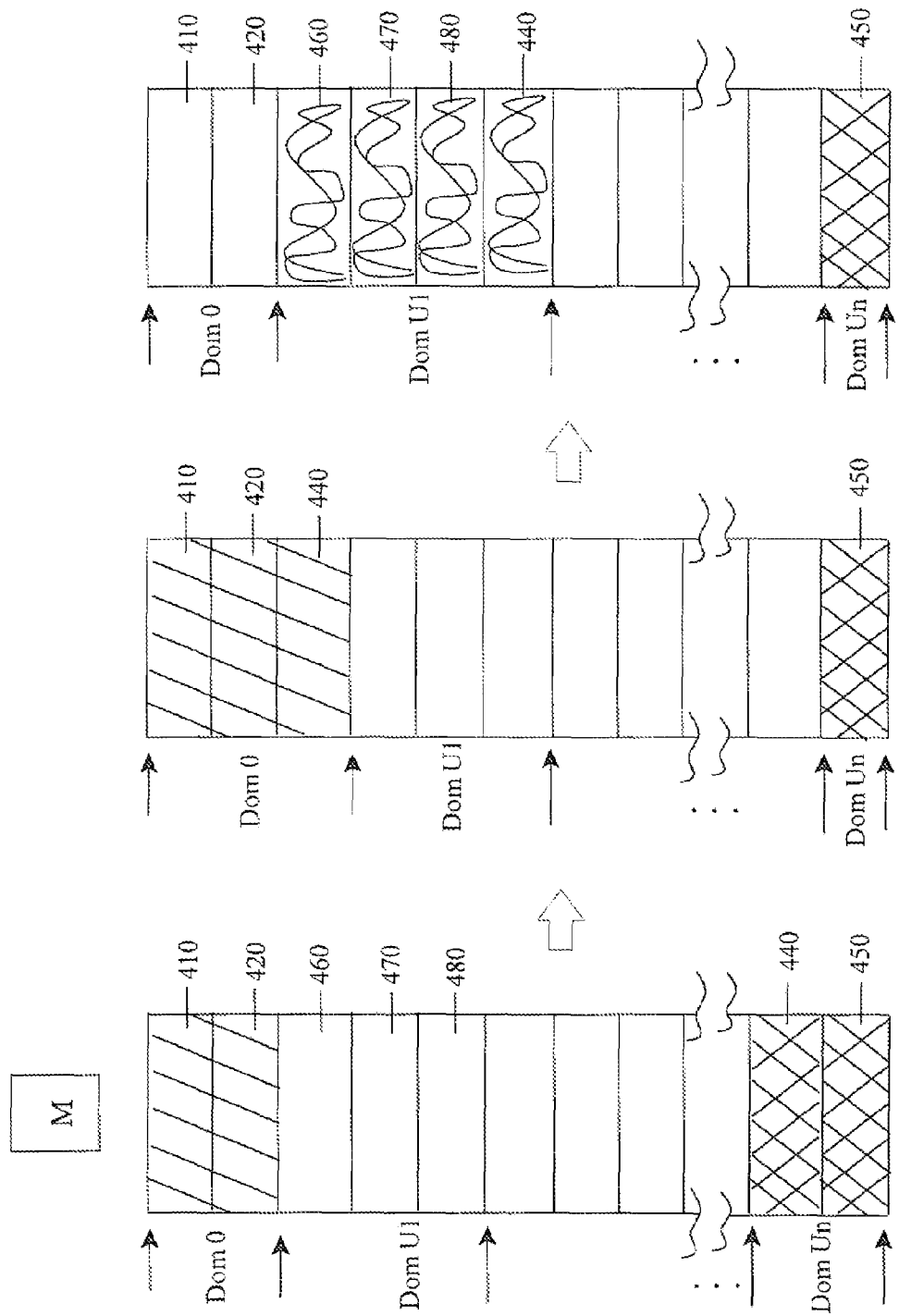

OPTIMAL MEMORY ALLOCATION FOR GUESTED VIRTUAL MACHINE(S)

FIELD OF THE INVENTION

Generally, the present invention relates to computing devices hosting virtual machines. Particularly, although not exclusively, it relates to hardware platforms hosting pluralities of domains of virtual machines and to managing its assets, especially memory. Other features contemplate computing policies and computer program products, to name a few.

BACKGROUND OF THE INVENTION

With the advent of virtual computing, it is known for a single hardware platform to guest many virtual machines. The platforms are often traditional, such as laptops, desktops, phones, PDAs, etc., and each virtual machine operates its own operating system, drivers, interfaces, applications, etc. on common assets of the platform. As has long been recognized, one of the key benefits for doing so is the ability to share workload throughput, such as by allocating physical resources to the virtual machines according to workload(s) being hosted. However, the state of the art today is anything but dynamic when it comes to allocating physical resources to virtual machines.

For instance, it is presently the situation that the creator of a virtual machine needs to, beforehand, specify all the physical resources requiring allocation to the machine. While the creator may have foreknowledge of the intended workload of the machine, sometimes no initial knowledge exists or such becomes inaccurate as the workload evolves over time. While some platforms allow modifying the initial allocation during running of the virtual machine, the current state of the art is far from supporting an environment where physical resources are optimally allocated to ensure meeting end-user mandated quality of service requirements. For instance, when memory is presently specified per each virtual machine, it is often the situation that the individual guest machines retain the initially allocated memory whether the workload requires it or not. In turn, by keeping otherwise available memory from other machines, a workload on a first virtual machine may not perform as expected while another may operate sufficiently, but with an overabundance of memory. The failure of the first machine, certainly, represents a failure in the quality of service.

Accordingly, a need exists in the art of virtual machine management for better (re)allocation of resources. The need further extends to allocating and managing physical memory to ensure that quality of service guarantees are met. Naturally, any improvements along such lines should further contemplate good engineering practices, such as ease of implementation, unobtrusiveness, stability, etc.

SUMMARY OF THE INVENTION

The foregoing and other problems become solved by applying the principles and teachings associated with the hereinafter-described optimal memory allocations per guested virtual machines. At a high level, each machine is allocated an initial amount of memory, but such is adjusted higher or lower depending upon compliance with a performance computing policy.

In more detail, one of the virtual machines is configured as a management domain that determines whether other virtual machines comply with a baseline level of performance. If not, an initial amount of memory for the other virtual machines is adjusted higher or lower. In this manner, the guest machines are each outfitted with sufficient memory to accomplish their respective workloads, and such is adjustable over time as workloads vary per machine. This also distributes throughput concerns throughout an entire platform to sufficiently guarantee a quality of service for each machine of the platform, regardless of its individual tasks.

In other features, future memory requirements for the guest virtual machines may be forecasted based on past indicia, such as record or audit logs. Also, specific performance policies may be characterized as a function of page fault rates. In turn, a single page fault may be characterized as when a disk I/O either evicts contents of a physical page when a given physical page frame is to be reassigned or populates the physical page with new contents. A hypervisor of the platform is a representative entity that computes actual page fault rates of each of the guest virtual machines during use. It may also provide them to a management domain that determines whether such complies with the policy or not. The hypervisor may average them over time or merely provide a threshold, above which, acceptability is established.

In a particular apparatus embodiment, a hardware platform of a computing device typifies a laptop computer, server, general or special purpose computer, phone, PDA, etc. Also, it includes a processor and memory, and remote or local storage. A plurality of virtual machines, each operate as an independent guest computing device on the processor, memory and storage, by way of scheduling control from a hypervisor layer, as is typical. However, a management domain is configured on the platform to adjust an initially allocated amount of memory higher or lower for one or more of the remaining guest virtual machines. As a result, memory allocation for virtual machines is made optimal, based on workload, and made truly dynamic. Also, it is now possible to actively manage and guarantee the quality of service (QOS) of virtual machines.

Executable instructions loaded on one or more computing devices for undertaking the foregoing are also contemplated as are computer program products available as a download or on a computer readable medium. The computer program products are also available for installation on a network appliance or individual computing devices.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 3A, 3B, 4A-4C and 5 are diagrammatic views in accordance with the present invention of representative memory locations being optimally allocated.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for optimally allocating memory to guest virtual machines.

Figure 1:
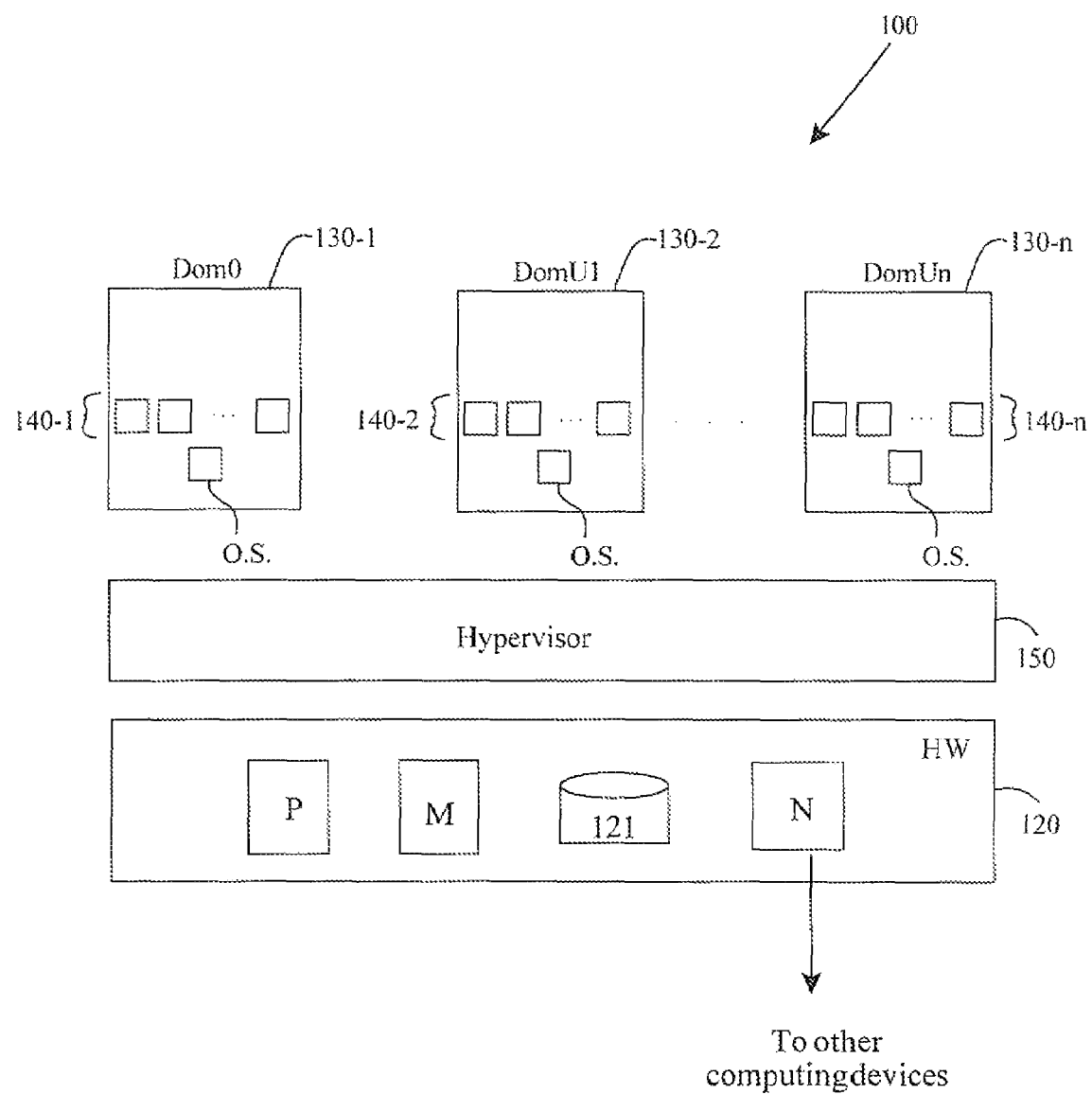
FIG. 1 is a diagrammatic view in accordance with the present invention of a representative virtualized computing arrangement for guested virtual machines.

With reference to FIG. 1, a computing system environment includes a computing device 100. Representatively, the device is a laptop computer, general or special purpose computer, a phone, a PDA, a server, etc., having a hardware platform 120. As is typical, the hardware platform embodies physical I/O and platform devices, memory (M), access to remote or local storage 121, processor (P), such as a CPU, Disk, USB, etc. In turn, the hardware platform hosts one or more virtual machines in the form of domains 130-1 (domain 0, or management domain), 130-2 (domain U1), ... 130-n (domain Un), each having its own guest operating system (O.S.) (e.g., Linux, Windows, Netware, Unix, etc.), applications 140-1, 140-2, ... 140-n, file systems, etc.

An intervening Xen or other hypervisor layer 150, also known as a "virtual machine monitor," or virtualization manager, is the virtual interface to the hardware and virtualizes the hardware. It is also the lowest and most privileged layer and performs scheduling control between the virtual machines as they task the resources of the hardware platform, e.g., memory, processor, storage, network (N), etc. The hypervisor also manages conflicts, among other things, caused by operating system access to privileged machine instructions. The hypervisor can also be type 1 (native) or type 2 (hosted), and skilled artisans understand the terminology. According to various partitions, the operating systems, applications, application data, boot data, or other data, executable instructions, etc., of the machines are virtually stored on the resources of the hardware platform, and such is typical in a virtual environment. Also, the virtual machines can fulfill any future-defined or traditional computing role. Leveraging the foregoing, FIG. 2 teaches a high-level flow 200 to optimally manage memory allocation for guested virtual machines (130). As will be seen, the process also takes into account (a) the workload being hosted in the virtual machine and (b) the quality of service assured to the workload. Preliminarily, however, a computing performance policy is established at step 202. This policy can be as simple as designating a fixed amount of available memory per each machine. It can be set by system administrators or designated by clients who request virtual machines from a vendor to undertake various computing roles. The policy can also be flexible and, in a particular embodiment below, can be based on acceptable page fault rates of machines as they operate during use. Alternatively, the policy can be set in a hierarchical fashion such that a primary virtual machine is always allocated enough memory to accomplish its task, while a secondary virtual machine gets the remaining memory, whether such is enough or not for its workload. Alternatively still, the policy can be set according to times of the day, week, year, etc., according to preferences given to clients, or the like. Naturally, skilled artisans can readily imagine others.

Regardless of policy or how it is set, step 204 contemplates the allocating of an initial amount of memory to each of the virtual machines. It can be done in a traditional way, such as by a system administrator designating memory based on foreknowledge of the intended workload of the machine. It can also be empirically determined by testing a virtual machine under use-based conditions and recording how much memory is needed in sum, per a given workload, per a given time frame, etc. Alternatively still, the memory can be initially allocated according to the policy, e.g., allocate most memory to one virtual machine, but not another, etc. In still another example, the initial memory allocation can be based on the minimal memory requirements of the operating system hosting the workload and any additional memory to accommodate the workload being hosted. If the workload is being migrated from a physical host, a good starting point in assessing initial allocations includes determining the amount of physical memory for the physical host and providing the guest virtual machine with comparable amounts of memory. Also, the allocation can be contiguous blocks of memory or not, and arranged in any fashion. It can also include traditional memory mapping and other techniques.

At step 206, it should be appreciated that when a virtual machine is guested on a hypervisor, the hypervisor has visibility into a number of key events in the virtual machine and this information can be used to make intelligent decisions about the resource needs of the guest virtual machines. One such key event is the rate at which page faults occur in a virtual machine and memory needs can be predicted based on the rate at which page faults are incurred. If the page fault rate is high, it indicates that perhaps the virtual machine is "thrashing" and is unable to accommodate its current working set of memory in the memory initially allocated to it. Thus, at step 206, the hypervisor computes the page fault rate per each virtual machine. In various embodiments, the page fault rates are averaged over a period of time, calculated at a given instance of time, established by a median or mean, or by any other basis that reveals a processing difficulty of the workload of the machine. Also, the page faults of interest are page faults that result in disk I/O either evicting the contents of a physical page when a given physical page frame is to be reassigned or populating the physical page with new contents (as part of page re-allocation within the guest).

At step 208, the page fault rate information is made available to the management domain (dom 0, FIG. 1). The management domain then uses the information to optimally allocate memory resources to the guest virtual machine under management. In one instance, step 210, the management domain determines whether the page fault rates comply (meet or exceed) the established computing policy. If so, the process repeats at a later time (predetermined, random, periodic, etc.) to ensure continued compliance with the policy, step 212. If not, the presently allocated memory (e.g., the initially allocated memory, or memory allocated from an earlier reallocation) is reallocated to ensure compliance, step 214. For this, several management examples are possible.

First, the physical memory allocation can be managed to minimize the page faults experienced by the guest. For example, when a service is hosted on a physical box, the physical memory on the box is statically allocated to the service whether or not the service needs all the allocated memory. On the other hand, then the service is hosted as a guest virtual machine, the page fault rate can be used as a proxy for the memory needs of the service and manage memory accordingly based on the dynamic memory needs of the service as the offered load on the service changes. FIGS. 3A, 3B and 4A-4C will be used to show examples. Also, this may be most appropriate for typical server workloads as memory is typically provisioned to minimize or avoid page thrashing.

Second, the physical memory allocation is managed to enforce quality-of-service guarantees. For example, since data center workloads tend to be long lived, it is possible to profile the performance characteristics of the service with respect to, for instance the amount of physical memory allocated to the service (with other resources such as I/O bandwidth and CPU resources not being the bottleneck). As will be seen in FIG. 6, this profiling can be used to set the upper limit on the amount of memory that needs to be allocated for a given level of performance. Within this limit, page fault rate can be used to detect the offered load on the service. Under this policy, we can dynamically manage the amount of physical memory allocated to the virtual machine to simultaneously manage the quality of service while optimizing the memory allocation—memory will be actively managed to match the offered load.

Figure 2:
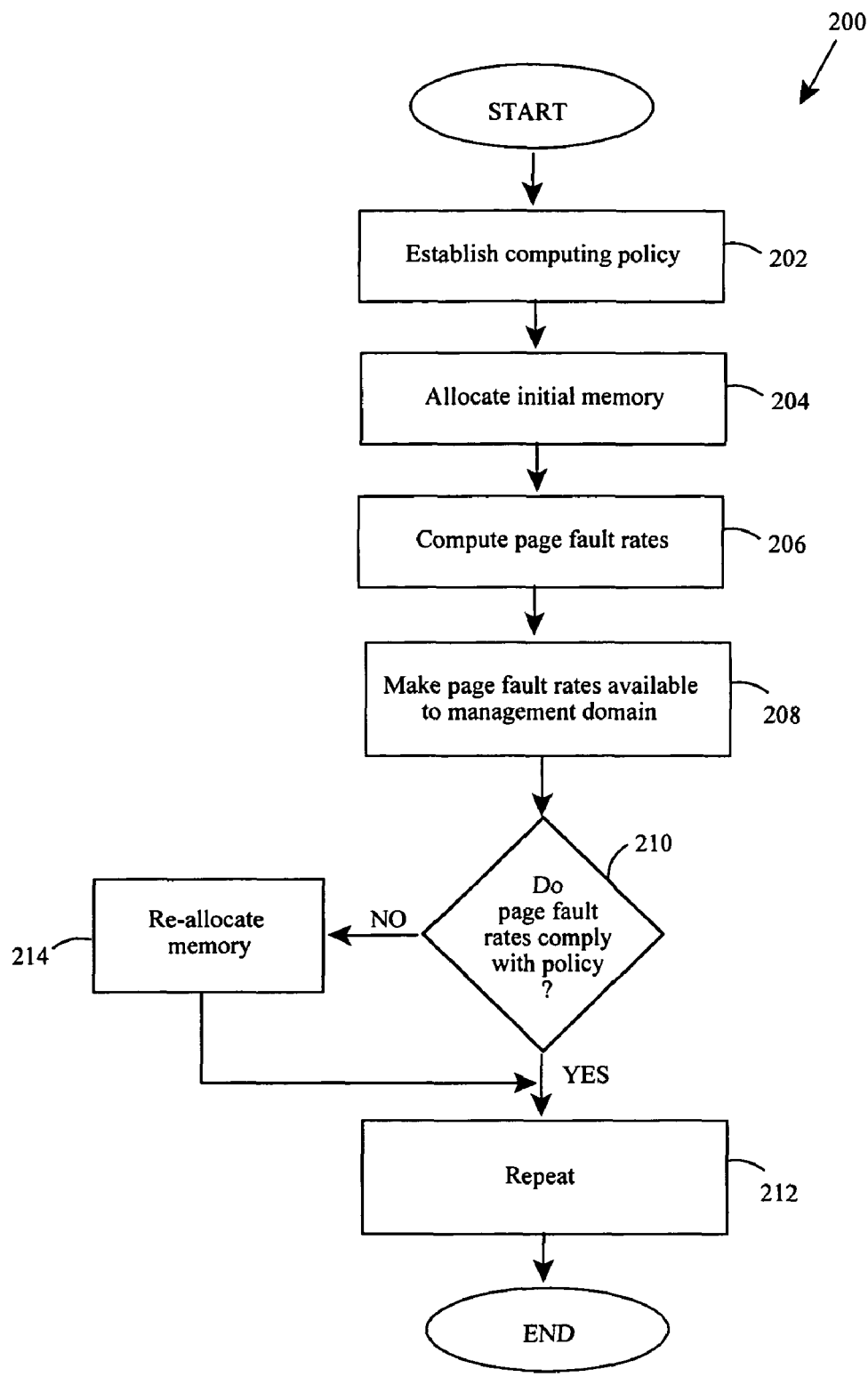
FIG. 2 is a flow chart in accordance with the present invention for the optimal allocation of memory to the guest virtual machines.

In summary, FIG. 2 shows the high level work-flow for the proposed optimization of memory for the guest virtual machines. In detail, the hypervisor is responsible for handling all hardware events including page faults. In turn, when a guest virtual machine incurs a page fault, the hypervisor gets control and pushes it back to the guest for further processing. Thus, the hypervisor can maintain page fault statistics on a per guest basis. As part of handling the page fault, the guest may in turn initiate a disk I/O. This disk I/O will flow through the management domain which typically serves as the I/O domain as well. The guest I/O rates along with the page fault rate information from the hypervisor and will be used to access the guest memory needs as described earlier. Among other advantages, the mechanism proposed here is guest agnostic and can be used to dynamically manage the quality of service afforded to virtual machines.

Figure 3A:
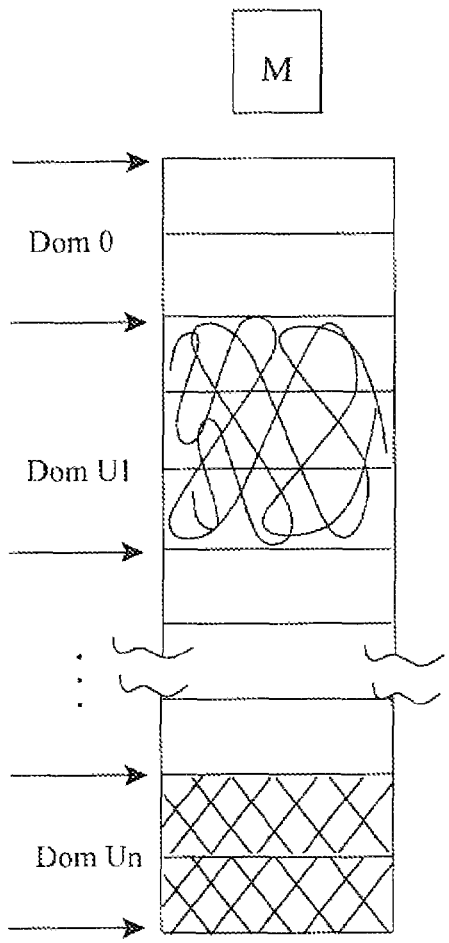
Figure 3B:
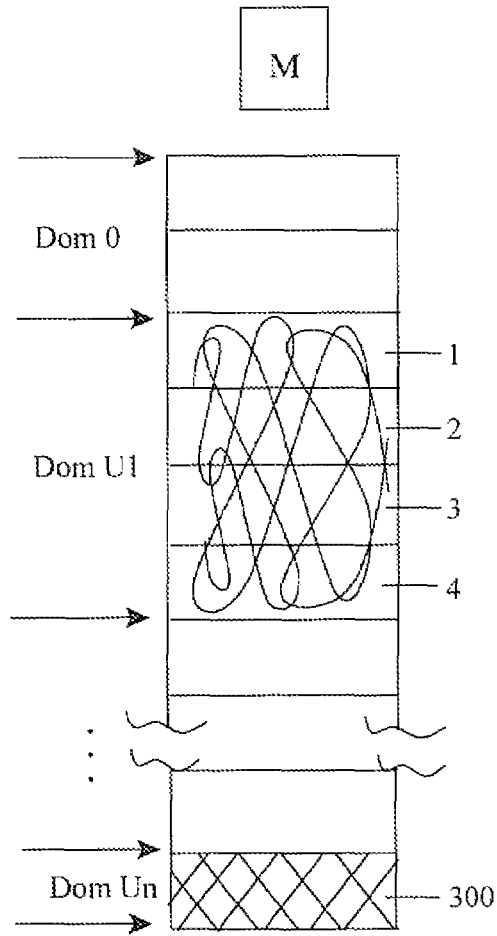

With reference to FIG. 3A, memory M is initially allocated to the various domains of the hardware platform of FIG. 1. As seen, dom 0 has two block of memory, dom U1 has three blocks, while dom Un has two blocks. Upon the determination of non-compliance with the computing policy for dom U1, at step 210, FIG. 2, its initial memory is re-allocated, step 214, FIG. 2. As a result, the memory M in FIG. 4 shows dom U1 with more blocks of memory, i.e, 1-4. In that memory per a hardware platform is essentially fixed in amount, absent an increase in hardware, the memory provided to dom U1 must come from somewhere else. To the extent dom Un is determined to have an abundance of memory, its blocks were decreased from two blocks to a single block 300. Meanwhile, the memory of the management domain remained the same.

Figure 5:
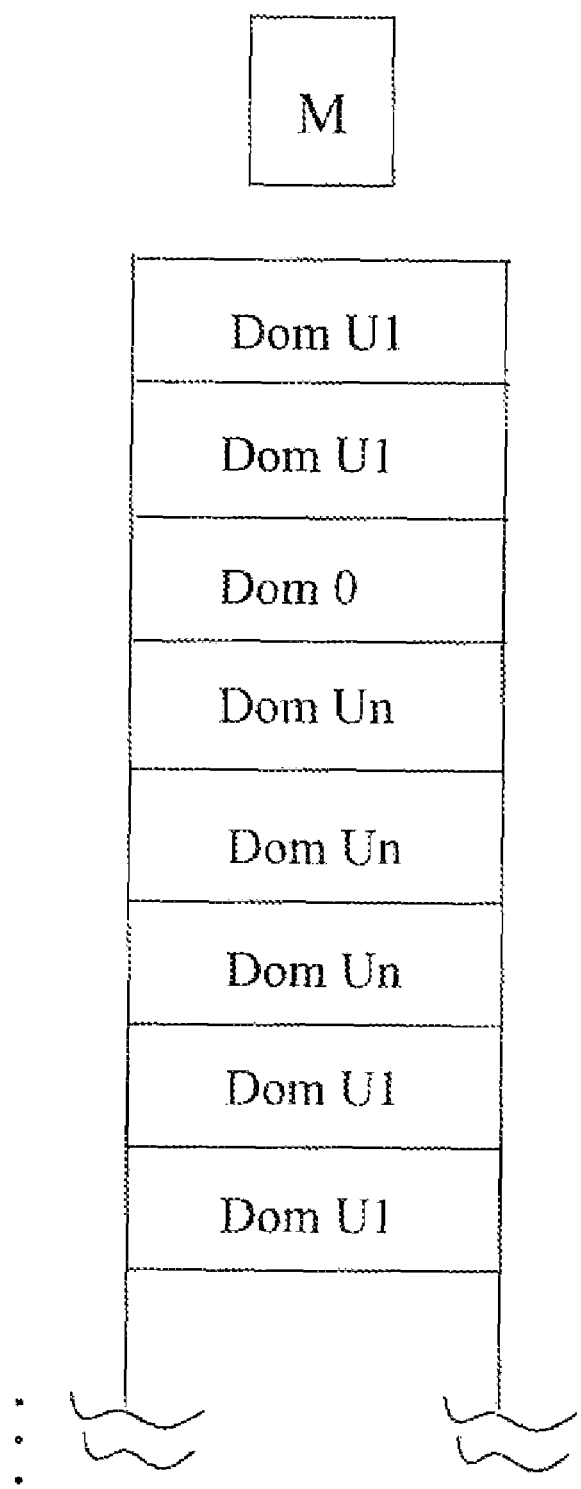

In FIGS. 4A-4C, however, it can be seen that memory of the management domain (dom 0) can also be used in the re-allocation of memory relative to other domains. In this instance, the initial memory of dom 0 allocated in FIG. 4A has been increased in FIG. 4B to three blocks 410, 420, 440 from two blocks 410, 420, and the memory increase came by decreasing dom Un's initial allocation of two blocks 440, 450 to a single block 450. Alternatively, the memory of the management domain can be used to supplement another's domain. As seen in FIG. 4C, memory block 440 of dom 0 is used for dom U1 to increase its initially allocated three blocks of memory 460, 470, 480 (FIG. 4A) to 460, 470, 480 and 440. Of course, other scenarios are now easily contemplated by skilled artisans. Also, the memory need not be contiguous memory locations as seen for dom U1 in FIG. 5.

Figure 6:
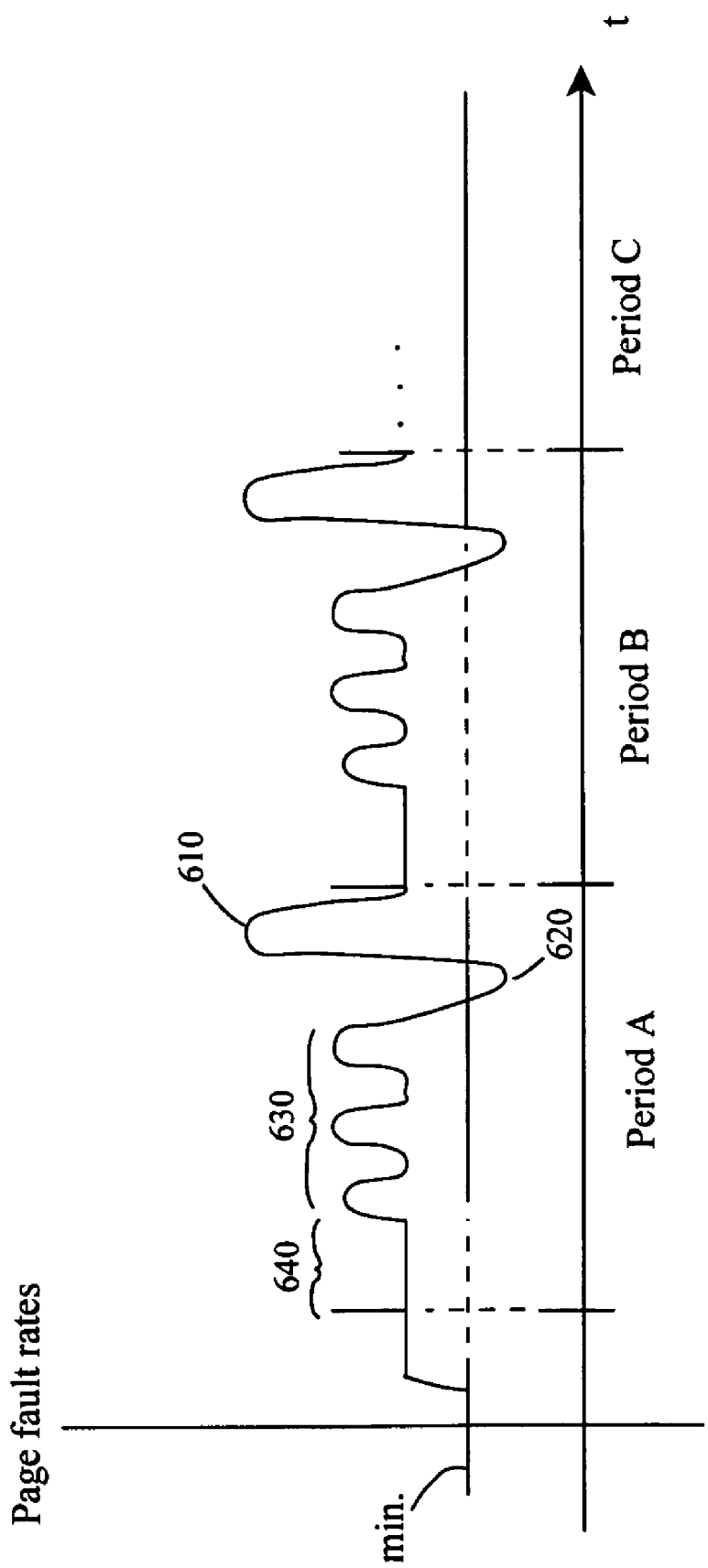
FIG. 6 is a graph in accordance with the present invention for, among other things, forecasting future memory needs of guest virtual machines.

With reference to FIG. 6, consider the example where a workload of a guest domain varies over time. In some instances, the workload is high 610, while in others it is low 620. At still other times, it is regularly cyclical 630 or constant 640. Correspondingly, consider that page fault rates become known to correspond to such workload capacity. By recording such, skilled artisans can recognize that the needs for future period C can be forecast by examining periods A and B. As such, memory can be preemptively allocated to accommodate period C, instead of being reactionary. Thus, audit logs, recording events, etc. can be monitored, examined, etc. by one or both of the hypervisor and management domain to optimally allocate memory. Also, minimum thresholds (min) can be learned and set to guarantee acceptable minimum quality-of-service requirements.

In any embodiment, skilled artisans will appreciate that some or all of the foregoing can be implemented with humans, such as system administrators, computing devices, executable code, or combinations thereof. In turn, methods and apparatus of the invention further contemplate computer executable instructions, e.g., code or software, as part of computer program products on readable media, e.g., disks for insertion in a drive of computing device, or available as downloads or direct use from an upstream computing device. When described in the context of such computer program products, it is denoted that executable instructions thereof, such as those bundled as components, modules, routines, programs, objects, data structures, etc., perform particular tasks or implement particular abstract data types within various structures of the computing system which cause a certain function or group of function, and enable the configuration of the foregoing.

Although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment, a method of allocating memory of a hardware platform hosting a plurality of guest virtual machines, comprising:
   allocating an initial amount of said memory to each said guest virtual machine; and
   adjusting the initial amount higher or lower for one or more of the plurality of guest virtual machines upon determining a failure of a performance computing policy by the one or more of the plurality of guest virtual machines;
   wherein the performance computing policy is established relative to page fault rates of the one or more of the plurality of guest virtual machines.

2. The method of claim 1, further including a management domain on the hardware platform, the adjusting the initial amount of said memory occurring by the management domain.

3. The method of claim 1, wherein the allocating the initial amount of said memory further includes determining a working amount of memory for the each said guest virtual machine based upon memory testing events or comparable amounts of memory from non-virtual machines.

4. In a computing system environment, a method of allocating memory locations of a hardware platform hosting a plurality of guest virtual machines on a processor and memory of the hardware platform by way of scheduling control from a virtualization manager configured on the hardware platform, comprising:

establishing a baseline level of performance for the plurality of guest virtual machines the establishing comprising determining an acceptable page fault rate for said each of the guest virtual machines;

allocating an initial amount of said memory locations to each said guest virtual machine; and adjusting the initial amount of the memory higher or lower for one or more of the plurality of guest virtual machines upon determining a failure of the baseline level of performance.

5. The method of claim 4, further including configuring the guest virtual machines on the hardware platform, the virtualization manager being a hypervisor layer that communicates the acceptable page fault rates with a management domain.

6. The method of claim 5, wherein the hypervisor computes actual page fault rates of said each of the guest virtual machines during use.

7. The method of claim 6, wherein the hypervisor averages over a period of time the computed actual page fault rates of said each of the guest virtual machines during use.

8. The method of claim 4, further including forecasting future memory requirements for said each of the guest virtual machines.

9. The method of claim 8, wherein the hypervisor makes available to the management domain the acceptable page fault rate for said each of the guest virtual machines.

10. The method of claim 9, wherein the hypervisor computes actual page fault rates of said each of the guest virtual machines during use and supplies them to the management domain, the management domain then said adjusts the initial amount of the memory higher or lower for the one or more of the plurality of guest virtual machines.

11. In a computing system environment, a method of allocating memory locations of a hardware platform hosting a plurality of guest virtual machines on a processor and memory of the hardware platform by way of scheduling control from a hypervisor configured on the hardware platform, comprising:

configuring the plurality of guest virtual machines on the hardware platform, including configuring a management domain;

establishing an acceptable page fault rate for each of the guest virtual machines;

allocating an initial amount of said memory locations to said each of the guest virtual machines; and adjusting the initial amount of the memory higher or lower for one or more of the plurality of guest virtual machines upon determining a failure of the acceptable page fault rate.

12. The method of claim 11, wherein the establishing the acceptable page fault rate further includes defining a single page fault as when a disk I/O either evicts contents of a physical page when a given physical page frame is to be reassigned or populates the physical page with new contents.

13. A computing device, comprising:

a hardware platform including a processor and memory;

a hypervisor layer on the hardware platform; and a plurality of virtual machines each operating as an independent guest computing device on the processor and memory by way of scheduling control from the hypervisor layer, wherein one of the virtual machines is a management domain configured to adjust an initially allocated amount of memory higher or lower for one or more remaining guest virtual machines upon determining a failure of a performance computing policy by the one or more of the plurality of guest virtual machines;

the determining a failure comprising determining that a predetermined page fault rate for the one or more remaining guest virtual machines has been exceeded.

14. The computing device of claim 13, wherein the hypervisor is connected to the management domain to provide the management domain with computed values for use in the determining the failure of the performance computing policy.

15. The computing device of claim 14, wherein the computed values are page fault rates for the one or more remaining guest virtual machines.

16. A computer program product for loading on a computing device to allocate memory on a hardware platform hosting a plurality of guest virtual machines on a processor and memory of the hardware platform by way of scheduling control from a virtualization manager also configured on the hardware platform, the computer program product having executable instructions to enable adjusting an initial amount of memory higher or lower for one or more of the guest virtual machines upon a failure of a performance computing policy by the one or more of the guest virtual machines;

the failure of a performance computing policy comprising exceeding a predetermined page fault rate for the one or more of the guest virtual machines.

17. The computer program product of claim 16, further including executable instructions so that the hardware platform can receive input of the performance computing policy as an acceptable page fault rate for each of the guest virtual machines.

18. The computer program product of claim 16, further including executable instructions so that the virtualization manager can calculate page fault rates of the one or more of the plurality of guest virtual machines.

19. The computer program product of claim 18, further including executable instructions so that the virtualization manager can provide the calculated page fault rates to a management domain configured on the hardware platform.

20. The computer program product of claim 19, further including executable instructions so that the management domain can said adjust the initial amount of memory locations.

* * * * *